(12) United States Patent
Ford

(10) Patent No.: US 9,967,334 B2
(45) Date of Patent: May 8, 2018

(54) COMPUTING DEVICE CONFIGURATION AND MANAGEMENT USING A SECURE DECENTRALIZED TRANSACTION LEDGER

(71) Applicant: DELL PRODUCTS L.P., Round Rock, TX (US)

(72) Inventor: Daniel A. Ford, Mount Kisco, NY (US)

(73) Assignee: DELL PRODUCTS LP, Round Rock, TX (US)

( * ) Notice: Subject to any disclaimer, the term of this patent is extended or adjusted under 35 U.S.C. 154(b) by 73 days.

(21) Appl. No.: 14/750,822

(22) Filed: Jun. 25, 2015

(65) Prior Publication Data

US 2016/0261690 A1    Sep. 8, 2016

Related U.S. Application Data

(63) Continuation-in-part of application No. 14/732,504, filed on Jun. 5, 2015, which is a continuation-in-part of application No. 14/702,321, filed on May 1, 2015, which is a continuation-in-part of application No. 14/635,577, filed on Mar. 2, 2015, application No. 14/750,822, which is a continuation-in-part of application No. 14/725,347, filed on May 29, 2015, which is a continuation-in-part of application No. 14/635,577.

(51) Int. Cl.
| | |
|---|---|
| *H04L 29/08* | (2006.01) |
| *G06F 9/445* | (2006.01) |
| *H04L 12/24* | (2006.01) |
| *H04L 29/06* | (2006.01) |
| *H04W 12/08* | (2009.01) |

(52) U.S. Cl.
CPC ............ *H04L 67/1044* (2013.01); *G06F 8/61* (2013.01); *H04L 41/0806* (2013.01); *H04L 41/0813* (2013.01); *H04L 63/10* (2013.01); *H04L 67/104* (2013.01); *H04W 12/08* (2013.01)

(58) Field of Classification Search
None
See application file for complete search history.

(56) References Cited

U.S. PATENT DOCUMENTS 6,591,292 B1    7/2003   Morrison
7,130,999 B2 *  10/2006  Yasala ................. H04L 63/0823
                                                    713/157

(Continued)

OTHER PUBLICATIONS

Kitahara et al, "A Method of Digital Rights Management based on Bitcoin Protocol", Jan. 2014, IMCOM (ICUIMC), ACM p. 1-6.*

(Continued)

*Primary Examiner* — Christopher Revak
(74) *Attorney, Agent, or Firm* — North Weber & Baugh LLP

(57) ABSTRACT

Aspects of the present invention provide systems and methods that facilitate the communicating of messages to a vastly scalable number of devices, independent of a centralized resource. In embodiments, a computing device, or a number of devices, may receive from a managing entity one or more messages via a block chain that is maintained by a plurality of decentralized nodes in a peer-to-peer network. In embodiments, the device or devices execute the instructions identified in the message, and if appropriate, return results.

20 Claims, 10 Drawing Sheets

(56) References Cited

U.S. PATENT DOCUMENTS

| | | | |
|---|---|---|---|
| 7,293,270 | B1 | 11/2007 | Gupta |
| 8,886,570 | B1 | 11/2014 | Amancherla |
| 9,135,787 | B1 | 9/2015 | Russell |
| 9,256,467 | B1 | 2/2016 | Singh |
| 9,298,806 | B1 | 3/2016 | Vessenes |
| 9,397,985 | B1* | 7/2016 | Seger, II ............ H04L 63/0442 |
| 9,406,063 | B2 | 8/2016 | Zhou |
| 9,514,293 | B1* | 12/2016 | Moritz .................. G06F 21/316 |
| 2001/0049726 | A1 | 12/2001 | Comeau |
| 2002/0143819 | A1 | 10/2002 | Han |
| 2005/0004804 | A1 | 1/2005 | English |
| 2006/0069647 | A1 | 3/2006 | Cozianu |
| 2006/0100955 | A1 | 5/2006 | Baldassini et al. |
| 2008/0320565 | A1* | 12/2008 | Buch ..................... H04L 12/581 726/4 |
| 2009/0150972 | A1* | 6/2009 | Moon ................... H04L 63/102 726/1 |
| 2012/0163584 | A1 | 6/2012 | Adjedj |
| 2013/0329883 | A1 | 12/2013 | Tama Yo-Rios |
| 2014/0201057 | A1 | 7/2014 | Shuster |
| 2014/0279433 | A1* | 9/2014 | Holman ................ G06Q 20/12 705/39 |
| 2014/0344015 | A1 | 11/2014 | Puértolas-Montañés et al. |
| 2015/0006739 | A1 | 1/2015 | Misra et al. |
| 2015/0228004 | A1 | 8/2015 | Bednarek |
| 2015/0287026 | A1* | 10/2015 | Yang .................. G06Q 20/3678 705/69 |
| 2015/0310424 | A1* | 10/2015 | Myers ................ G06Q 20/3678 705/69 |
| 2015/0348017 | A1* | 12/2015 | Allmen ................ G06Q 20/367 705/76 |
| 2015/0356524 | A1 | 12/2015 | Pennanen |
| 2015/0356555 | A1 | 12/2015 | Pennanen |
| 2015/0371224 | A1* | 12/2015 | Lingappa ............ G06Q 20/065 705/71 |
| 2015/0379510 | A1* | 12/2015 | Smith ................ G06Q 20/3829 705/71 |
| 2016/0071108 | A1 | 3/2016 | Caldera |
| 2016/0086175 | A1* | 3/2016 | Finlow-Bates ....... H04L 9/3271 705/77 |
| 2016/0162882 | A1 | 6/2016 | McClung, III |
| 2016/0217436 | A1* | 7/2016 | Brama .................. G06Q 20/06 |
| 2016/0218879 | A1 | 7/2016 | Ferrin |
| 2016/0254910 | A1 | 9/2016 | Finlow-Bates |
| 2016/0260069 | A1* | 9/2016 | Holman ................ G06Q 20/22 |
| 2016/0260169 | A1* | 9/2016 | Arnold .................. G06Q 40/12 |
| 2016/0267472 | A1 | 9/2016 | Lingham |
| 2016/0275461 | A1 | 9/2016 | Sprague |
| 2016/0283920 | A1 | 9/2016 | Fisher |
| 2016/0292672 | A1 | 10/2016 | Fay |
| 2016/0300227 | A1 | 10/2016 | Subhedar |
| 2016/0300234 | A1* | 10/2016 | Moss-Pultz ........ G06Q 20/3829 |
| 2016/0306966 | A1 | 10/2016 | Srivastava |
| 2016/0321654 | A1 | 11/2016 | Lesavich |
| 2016/0330027 | A1* | 11/2016 | Ebrahimi ............. H04L 9/3066 |
| 2016/0330031 | A1* | 11/2016 | Drego .................. H04L 9/3239 |
| 2016/0335628 | A1 | 11/2016 | Weigold |
| 2016/0342977 | A1* | 11/2016 | Lam ...................... G06Q 20/02 |
| 2016/0342978 | A1* | 11/2016 | Davis .................... G06Q 20/02 |
| 2016/0342989 | A1* | 11/2016 | Davis .................... G06Q 20/385 |
| 2016/0342994 | A1* | 11/2016 | Davis .................... G06Q 20/027 |
| 2016/0344543 | A1* | 11/2016 | Alness ................. G06Q 20/065 |
| 2016/0350749 | A1* | 12/2016 | Wilkins ............... G06Q 20/382 |
| 2016/0358184 | A1* | 12/2016 | Radocchia ......... G06Q 30/0185 |
| 2017/0005804 | A1* | 1/2017 | Zinder .................. H04L 9/3247 |
| 2017/0061398 | A1 | 3/2017 | Joseph |
| 2017/0236123 | A1* | 8/2017 | Ali ...................... G06Q 20/401 705/75 |
| 2017/0243241 | A1* | 8/2017 | Boutelle ............ G06Q 30/0229 |
| 2017/0279800 | A1* | 9/2017 | Castinado ........... H04L 63/0861 |
| 2017/0295021 | A1* | 10/2017 | Aranda Gutierrez . H04L 9/3239 |
| 2017/0310653 | A1* | 10/2017 | Zhang .................... H04L 63/08 |

OTHER PUBLICATIONS

Underwood, "Blockchain Beyond Bitcoin", Nov. 2016, Communications of ACM, vol. 59, No. 11, p. 15-17.*

Maxwell et al, " 'Effing' the Ineffable: Opening up Understandings of the Blockchain", Jul. 2015, British HCI, ACM, p. 208-209.*

Crary et al, "Peer-to-Peer Affine Commitment using Bitcoin", Jun. 2015, PLDI'15, ACM, p. 479-488.*

Dziembowski, "Introduction to Cryptocurrencies", Oct. 2015, CCS' 15, ACM, p. 1700-1701.*

Coeckelbergh et al, "Cryptocurrencies as Narrative Technologies", Sep. 2015, SIGCAS Computers & Society, vol. 45, No. 3, p. 172-178.*

Peck, "Do You Need a Blockchain? This Chart will tell you if the technology can solve your problem", Oct. 2017, IEEE, p. 1-3.*

Crosby et al, "BlockChain Technology, Beyond Bitcoin", Oct. 16, 2015, Sutardja Center fro Entrepreneurship & Technology Technical Report, p. 1-35.*

Boudguiga et al, "Towards Better Availability and Accountability for IoT Updates by means of a Blockchain", 2017, 2017 IEEE European Symposium on Security and Privacy Workshops (EuroS&PW), p. 50-58.*

Rizzo, Pete, "Fred Wilson: Blockchain Applications Still Biggest Opportunity in Bitcoin," Jan. 24, 2015, printed from the internet: URL: http://www.coindesk.com/fred-wilson-blockchain-applications-still-biggest-opportunity-bitcoin/, 7pgs.

"BitCloud," printed from the internet: URL:http://www.bitcloudproject.org, 2014, 14pgs.

Buterin, Vitalik, Ethereum White Paper, "A Next Generation Smart Contract & Decentralized Application Platform," 2014, printed from the internet: URL:http://ethereum.org/pdfs/ethereumwhitepaper.pdf, 36pgs.

Satoshi Nakamoto, "Bitcoin: A Peer-to-Peer Electronic Cash System," 9pgs.

Wood, Dr. Gavin, "Ethereum: A Secure Decentralised Generalised Transaction Ledger Final Draft—Under Review," www.ethereum.org, 2014, printed from the internet: URL:http://gavwood.com/paper.pdf, 29pgs.

Namecoin, printed from the internet: URL:http://namecoin.info/, 3pgs.

Syscoin, printed from the internet: URL:http://syscoin.org/, 2pgs.

Syscoin, printed from the internet: URL: http://syscoin.org/doc_uploads/How_Syscoin_Innovates_Infographic.png.

Szabo, Nick, "The Mental Accounting Barrier to Micropayments," printed from the internet: URL:http://szabo.best.vwh.net/micropayments.html, 1996, 4pgs.

Non-Final Office Action dated Dec. 29, 2016, in U.S. Appl. No. 14/732,504 (17 pgs).

Non-Final Office Action dated Jan. 20, 2017, in U.S. Appl. No. 14/725,347 (42 pgs).

Non-Final Office Action dated Dec. 16, 2016, in U.S. Appl. No. 14/702,321 (16 pgs).

Kitahara et al, "A Method of Digital Rights Management based on Bitcoin Protocol", Jan. 2014, IMCOM (ICUIMC), ACM p. 1-6, (6 pgs).

Underwood, "Blockchain Beyond Bitcoin", Nov. 2016, Communications of ACM, vol. 59, No. 11, p. 15-17, (3 pgs).

Maxwell et al, "'Effing' the Ineffable: Opening up Understandings of the Blockchain", Jul. 2015, British HCI, ACM, p. 208-209, (pp. 2).

Crary et al, "Peer-to-Peer Affine Commitment using Bitcoin", Jun. 2015, PLDI' 15, ACM, p. 479-488, (10 pgs).

Dziembowski, "Introduction to Cryptocurrencies", Oct. 2015, CCS' 15, ACM, p. 1700-1701, (2 pgs).

Coeckelbergh et al, "Cryptocurrencies as Narrative Technologies", Sep. 2015, SIGCAS Computers & Society, vol. 45, No. 3, p. 172-178, (7pgs).

Ateniese et al, "Certified Bitcoins", Sapienza-University of Rome, Italy, ACNS 2014, pp. 80-96, (17 pgs).

Barber et al, "Bitter to Better-How to make Bitcoin a Better Currency," 2012, pp. 399-414, (16pgs).

Response filed Mar. 16, 2017, in related U.S. Appl. No. 14/702,321 (13 pgs).

(56) References Cited

OTHER PUBLICATIONS

Response filed Mar. 29, 2017, in related U.S. Appl. No. 14/732,504 (12 pgs).
Final Office Action dated Jul. 7, 2017, in U.S. Appl. No. 14/732,504 (14 pgs).
Response filed Sep. 7, 2017, in related U.S. Appl. No. 14/732,504 (10 pgs).
Non-Final Office Action dated Jun. 22, 2017, in U.S. Appl. No. 14/725,347 (41 pgs).
Response filed Sep. 22, 2017, in related U.S. Appl. No. 14/725,347 (12 pgs).
Non-Final Office Action dated Jun. 1, 2017, in related U.S. Appl. No. 14/635,577 (17 pgs).
Response filed Aug. 11, 2017, in related U.S. Appl. No. 14/635,577 (7 pgs).
BitTorrent; From Wikipedia, the free encyclopedia; Feb. 25, 2016; pp. 1-23; http://en.wikipedia.org/wiki/BitTorrent (22 pgs).
The Byzantine Generals Problem; ACM Transactions on Programming Languages and Systems (TOP LAS); vol. 4 Issue 3, Jul. 1982 pp. 382-401; ACM New York, NY, USA; http://dl.acm.org/citation.cfm?id=357176m (20 pgs).
Bitcoin: A Peer-to-Peer Electronic Cash System; Satoshi Nakamoto; www.bitcoin.org; May 24, 2009; pp. 1-9; hllps://bitcoin.org/bitcoin.pdf (9 pgs).
A Next Generation Smart Contract & Decentralized Application Platform, Vitalik Buterin; Ethereum White Paper; Aug. 16, 2005; pp. 1-36; hllps://www.ethereum.org/pdfs/EthereumWhitePaper.pdf (36 pgs).
Ethereum: A Secure Decentralised Genralised, Final Draft—Under Review; Dr. Gavid Wood; Lead, Ethereum Project; Apr. 6, 2014; pp. 1-34; http://gavwood.com/paper.pdf (32 pgs).
Final Office Action dated Oct. 24, 2017, in U.S. Appl. No. 14/635,577 (16 pgs).
Final Office Action dated Jan. 12, 2018, in U.S. Appl. No. 14/725,347, (43 pgs).
Final Office Action dated Oct. 6, 2017, in U.S. Appl. No. 14/702,321 (23 pgs).
Non-Final Office Action dated Nov. 9, 2017, in related U.S. Appl. No. 14/732,504 (8 pgs).
Peck, "Do You Need a Blockchain? This Chart will tell you if the technology can solve your problem", Oct. 2017, IEEE, p. 1-3 (3 pgs).
Crosby et al, "BlockChain Technology, Beyond Bitcoin", Oct. 16, 2015, Sutardja Center fro Entrepreneurship & Technology Technical Report, p. 1-35 (35 pgs).
Boudguiga et al, "Towards Better Availability and Accountability for IoT Updates by means of a Blockchain", 2017, 2017, IEEE European Symposium on Security and Privacy Workshops (EuroS &PW), p. 50-58 (9 pgs).
Response filed Dec. 19, 2017 in related U.S. Appl. No. 14/732,504 (8 pgs).
Response filed Dec. 21, 2017 in related U.S. Appl. No. 14/702,321 (13 pgs).
Notice of Allowance and Fees Due dated Jan. 17, 2018, in U.S. Appl. No. 14/732,504, (12 pgs).
Notice of Allowance and Fees Due dated Jan. 29, 2018, in U.S. Appl. No. 14/702,321, (19 pgs).

* cited by examiner

COMPUTING DEVICE CONFIGURATION AND MANAGEMENT USING A SECURE DECENTRALIZED TRANSACTION LEDGER

CROSS-REFERENCE TO RELATED APPLICATION

This patent application claims priority to and is a continuation-in-part of co-pending and commonly-owned U.S. patent application Ser. No. 14/732,504, filed on 5 Jun. 2015, entitled "DEFERRED CONFIGURATION OR INSTRUCTION EXECUTION USING A SECURE DISTRIBUTED TRANSACTION LEDGER," listing YuLing Chen and Daniel A. Ford as inventors, which claims priority to and is a continuation-in-part of co-pending and commonly-owned U.S. patent application Ser. No. 14/702,321, filed on 1 May 2015, entitled "DEVICE REPORTING AND PROTECTION SYSTEMS AND METHODS USING A SECURE DISTRIBUTED TRANSACTIONAL LEDGER," listing Daniel A. Ford and YuLing Chen as inventors, which claims priority to and is a continuation-in-part of co-pending and commonly-owned U.S. patent application Ser. No. 14/635,577, filed on 2 Mar. 2015, entitled "CONTAINERIZED COMPUTATIONAL TASK EXECUTION MANAGEMENT USING A SECURE DISTRIBUTED TRANSACTION LEDGER," listing Daniel A. Ford as inventor.

This patent application also claims priority to and is a continuation-in-part of co-pending and commonly-owned U.S. patent application Ser. No. 14/725,347, filed on 29 May 2015, entitled "METHODS AND SYSTEMS FOR OBFUSCATING DATA AND COMPUTATIONS DEFINED IN A SECURE DISTRIBUTED TRANSACTION LEDGER," listing Daniel A. Ford, Irwin O. Reyes, and Rajesh Narayahan as inventors, which claims priority to and is a continuation-in-part of co-pending and commonly-owned U.S. patent application Ser. No. 14/635,577, filed on 2 Mar. 2015, entitled "CONTAINERIZED COMPUTATIONAL TASK EXECUTION MANAGEMENT USING A SECURE DISTRIBUTED TRANSACTION LEDGER," listing Daniel A. Ford as inventor.

Each of the above-mentioned patent documents is incorporated by reference herein in its entirety and for all purposes.

TECHNICAL FIELD

The present disclosure relates to information handling devices, such as smart phones, tablets, servers, and laptops. More particularly, the present disclosure related to systems and methods for facilitating the configuration and management of vast numbers of computing devices without requiring a centralized authority.

DESCRIPTION OF THE RELATED ART

As the value and use of information continues to increase, individuals and businesses seek additional ways to process and store information. One option available to users is information handling systems. An information handling system (or computing device) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The last several years have also seen a dramatic increase in the use of computing devices and also in computing capacity. As a result, information handling systems exists, in many different applications and form factors—including servers, laptops, mobile phones, tablets, smart watches, phablets, appliances, thermostats, smart packages, etc. These devices represent powerful computing resources—but many of these devices are underutilized. Accordingly, these devices could provide powerful computing resources that could be used by others.

However, one problem with using the computing capacity of a third party device or a remote device is that the device must be configured and managed remotely. In conventional practice, when a collection of computing devices (laptops, personal computers, servers, mobile phones, embedded processors, etc.) are owned or controlled by a specific entity (e.g., a corporation), the collection is typically configured and managed by that entity, or a delegated proxy, through the use of a centralized configuration and management system. Such an approach allows the entity to establish a uniform configuration for such devices, to monitor their use and behavior, and to reduce the cost of maintaining their configuration. The drawbacks of this approach is that, in general, there are no management alternatives if the number of such computing devices is overwhelming large, the devices are owned by third parties, or the owning/managing entity ceases to exist.

Accordingly, what is needed are systems and methods that facilitates the configuration and management of vast numbers of computing devices without requiring a centralized authority.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
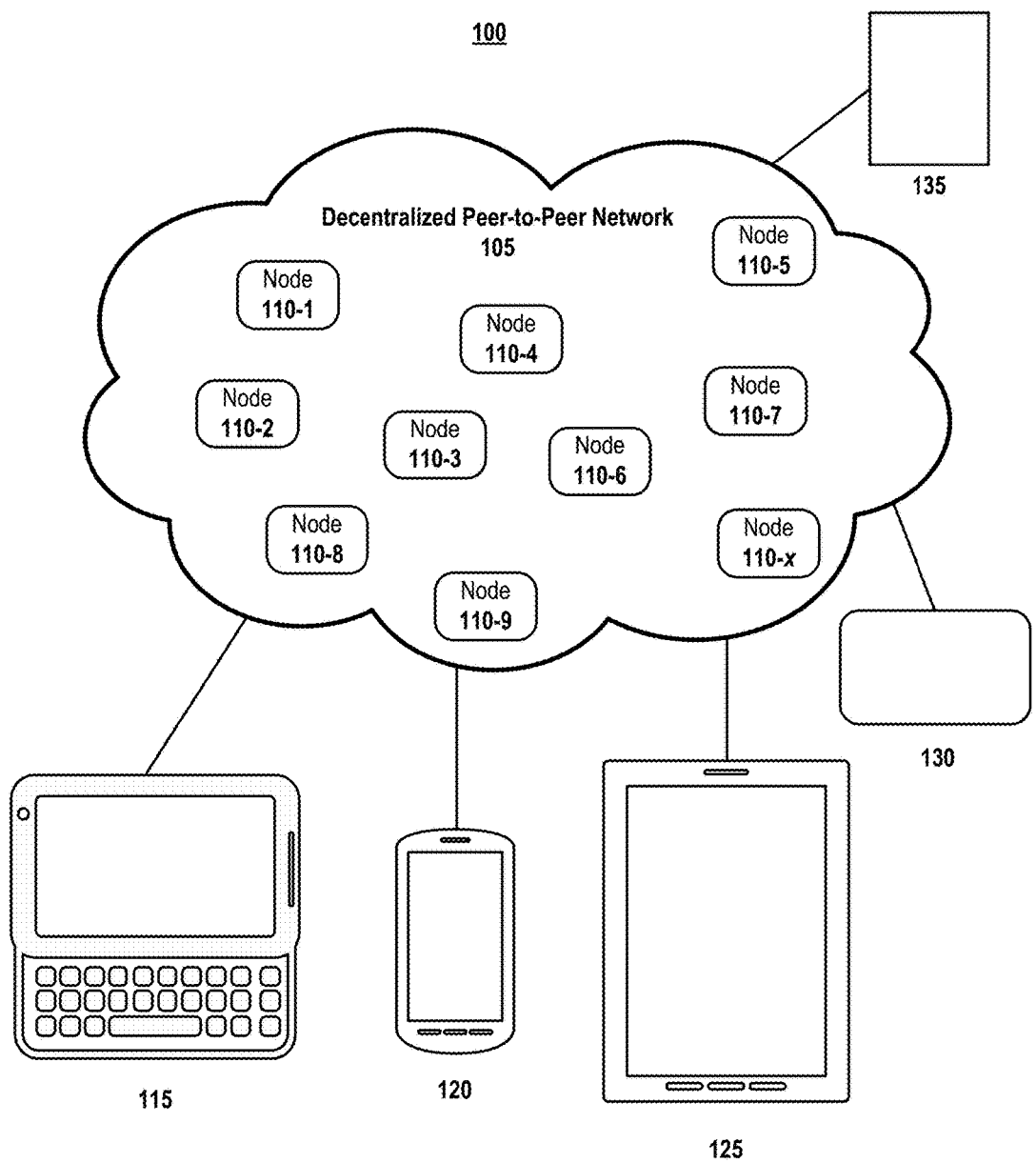
FIG. 1 depicts a decentralized network for providing communications to and from devices according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "messages," "blocks," and "data," shall be understood to mean a group of bits that can be transported across a network. These terms shall not be interpreted as limiting embodiments of the present invention to particular configuration; and, these terms along with similar terms such as "data," "data traffic," "information," "cell," etc. may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the present invention provide systems and methods that facilitate the configuration and management of a large number of computing devices without requiring a centralized authority.

Currently, computing devices are often used in applications and environments where humans are "in-the-loop," for instance, using their laptops, or monitoring the consumption of electricity in their individual homes. As such, there is typically a direct correspondence between the numbers of such devices, and the size of a relatively static human population (e.g., employees of a company, residents of a state, users of a web site, etc.). For example, each employee of a company might be assigned a corporate laptop, or there might be a "smart meter" measuring electric power usage for individual houses. It would be very unusual for an employee to be assigned an arbitrary number of laptops, or, for a house to have more than one smart meter. Hence, the number of such "human-associated" devices has typically been constrained or correlated by an "in-the-loop" human population (e.g., employees, users, customers, etc.), and so, it is not excessively large. Thus, the numbers of such devices typically range from tens of thousands (e.g., employee laptops, web servers in a large data center), to several tens of millions (e.g., household smart meters, automobiles).

The development of smart phones and other computing devices in the first decade of the 21$^{st}$ century has pushed the development of cheap, but extremely powerful, processors, and the deployment of nearly ubiquitous network connectivity. This, and the drive of corporations to seek new areas of profit and new ways of optimizing their existing resources, is creating an increasing number of applications for which humans are completely "out-of-the-loop." Examples include the automation of industrial manufacturing, the development of "smart" machine tools and equipment, the optimization of commercial operations (such as retail and real-estate management), the development of more efficient transportation logistics, the monitoring of transportation infrastructure (such as roads and bridges), etc.—the list is almost endless. This decoupling of the applications of computing technology from a corresponding human population is creating two situations.

The first situation is that in these applications relationships with human populations have been replaced with relationships with populations of "things," including other computing devices. Unlike the human population, the population of "things" is large. This trend is eliminating the constraints on the number of computing devices deployed in the world and creating a situation where, in the future, there will be a vast number of computing devices, likely tens-of-billions, if not many more.

The second situation being created is one where an increasing number of computing devices are being embedded into very long-lived infrastructure, with the expectation that they will operate, and be viable, for the life of that infrastructure. According to the "2013 Report Card for America's Infrastructure," the average age of the over 600,000 bridges in the United States is forty-three years, with many being sixty-five years old, or older. Today, most entities that are capable of managing computing devices deployed in such long-lived applications (e.g., "smart" strain gauges and other types of environmental monitors), did not exist forty-three years ago, and, given the vagaries of corporate and institutional livelihood, are unlikely to exist forty-three years hence.

The resulting combination is a world comprising a vast, unprecedented number of computing devices—an "Internet of Things." Furthermore, these devices will likely remain viable beyond the typical lifetime of the institutional entity that created, and presumably, manages them.

Presented herein are systems and methods that address the problem of configuring and managing a vast collection of computing devices without using a centralized controller. Embodiments include leveraging the data storage and compute capabilities of a secure decentralized transaction ledger. Such a ledger is a data structure that can record both data and code (which can be executable code), and does so in a way that any of a variety of computing devices can validate the authenticity of the data and/or code, and with which the compute device can record its own data and/or code for others to validate and consume.

One of the key characteristics of the ledger is that it serves as a trustworthy data source in an environment in which no individual data source can be trusted, in particular, in an environment where there is no central controlling authority that either exists, or, if it did, it may not be trusted. The ledger is trusted by being a cryptographically verifiable aggregation of a large number of data sources, most of whom are trustworthy. The ledger is secure because it contains a cryptographically verifiable consensus of its contents that is produced and maintained by the large number of ledger participants in a manner that is computationally difficult to forge. Being maintained by many users, or nodes, makes the ledger completely decentralized. There is no single source for the ledger and a user can verify that the ledger's contents are correct.

In embodiments, data in the ledger may be of various types and/or sizes. For any particular computing device, it can contain configuration information, commands, queries, software updates, or any other data relevant to the computing device.

In embodiments, aspects of the present invention comprise having a computing device (or devices) retrieve and maintain a copy of the ledger. It watches the contents of the ledger for messages that it should process. In embodiments, these messages may be directly, and specifically, addressed to the computing device; or, they may be more generally addressed to devices of its type or characteristics (e.g., all thermometers). In embodiments, some of the messages may prompt configuration changes on the compute device, while others may be simple queries (e.g., "What is the temperature at your location?"). In embodiments, a device may initiate its requests, or generate replies by adding its own messages, or other data, into the ledger. In embodiments, devices may process the ledger in parallel; thus, for example, one device might issue a query to "all thermometers" for their current temperature value, and all such devices would respond when they received the message by entering their response into the ledger or to another reporting site. It should be noted that a benefit of having the responses not sent directly to the requestor is that the requestor will not be overwhelmed by a vast number of responses (essentially creating its own denial-of-service attack) if, for example, a billion thermometers send their replies all at once.

In embodiments, a secure distributed transactional ledger, which is a publicly readable data structure that is maintained by a large number of distributed, separately owned, and administered computers, may be used to communicate configuration and management messages to devices. Thus, so long as the ledger is maintained, the contents of a ledger are always accessible; and, due to the manner in which the ledger is maintained, it can always be trusted. Thus, any messages entered into a ledger may be retrieved in the future without hindrance. For example, a message may be retrieved by a computing system. In embodiments, the messages may be obfuscated (e.g., encrypted) such that their true nature cannot be determined except by the end recipient. Access to the ledger means that the messages will be receivable by the computing device.

It shall also be noted that there are several advantages to such systems. For example, the advantages of using a secure distributed transactional ledger include that it is a widely accessible, redundantly distributed, data structure that provides logical and temporal decoupling between both ends of a communications dialog. This is useful because, by its nature, it is highly available, is extremely secure, and allows indirect communication. It shall be noted that the last point is useful because it dramatically simplifies how communication channels are established and maintained when more specific network addressing information might not be available. This is the case when a computing device will be connected in the future to an arbitrary network and receive an address that cannot be known beforehand, and as such cannot be directly addressed.

Additional details are provided by way of illustration through description of various embodiments, below. These embodiments are provided by way of illustration and not limitation; one skilled in the art shall recognize other applications and embodiments that fall within the scope of the invention.

B. Decentralized Network Implementations

FIG. 1 depicts an embodiment of a distributed peer-to-peer network 105, which comprises a plurality of nodes 110-1 through 110-n (which may be referred to herein individually or collectively (depending upon context) as 110-x) and may be implemented by a plurality of information handling systems. In embodiments, an information handling system includes any instrumentality or aggregate of instrumentalities operable to compute, classify, process, transmit, receive, retrieve, originate, switch, route, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device, a smart package, or other electronic device, a network server, a network storage device, a switch router or other network communication device, or any other suitable device and may vary in size, shape, performance, functionality, and price. Further, an information handling system may include processing resources for executing machine-executable code, such as a central processing unit (CPU), a programmable logic array (PLA), an embedded device such as a System-on-a-Chip, or other control logic hardware. An information handling system may also include one or more computer-readable media for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display.

Peer-to-peer network 105 represents a computing environment for operating a decentralized framework that maintains a distributed data structure, which may be referred to herein as a secure distributed transaction ledger or a block chain. This secure distributed transaction ledger may support various functions, such as distributing computational tasks from one or more systems to one or more other systems, supporting a cryptocurrency and messaging, among other functions.

To maintain the secure distributed transaction ledger among the various nodes 110-x in the peer-to-peer network 105, a set of procedures are followed. Generally, such a network would suffer from inherent uncertainty and distrust between the nodes when they transact because they are typically unaffiliated with each other, may be transacting across vast distances (including in different countries), may be transacting anonymously, and because there is no centralized control or management to monitor or to resolve disputes. However, because the ledger is maintained publicly (i.e., all nodes can get a copy of the ledger) and because it is maintained according to set procedures that employ cryptographic methods and a proof-of-work concept, the uncertain and distrust elements are mitigated.

Thus, in embodiments, the secure distributed transaction ledger, or block chain, is a public ledger maintained collectively by the nodes in the network 105. The block chain includes blocks with data regarding recent transactions and/or messages, linking data that links one block to its previous block in the block chain, proof-of-work data that ensures that the state of the block chain is valid, and is endorsed by the majority of the record keeping systems. Furthermore, in embodiments, all confirmed transactions are included in the block chain and are done so using cryptography. This way, the integrity and the chronological order of the block chain are enforced and can be independently verified by each node.

In embodiments, the new transactions are added to the block chain using a distributed consensus system that confirms these pending transactions by including them in the block chain through a process commonly referred to as "mining." Mining enforces a chronological order in the block chain and helps create and maintain integrity of the system. For transactions to be confirmed during the mining process, the transactions must be packed in a block and linked to the prior block, all according to a set procedures involving cryptography (e.g., cryptographic checksums).

Properly adding a block to the chain is very computationally intensive, but it is also relatively easy to verify. Because of this computational asymmetry, the block chain can be readily verified but nearly impossible to modify while maintaining the correct chaining. Thus, this linking prevents previous blocks from being modified because doing so would invalidate all following blocks.

In embodiments, as a reward for mining, nodes earn fees for the transactions that they successfully add to the block chain. However, the mining is so difficult that it essentially creates a competitive lottery between the nodes in which the node that is able to successfully add the block to the chain, before any other node, gets rewarded. In embodiments, the reward can be units of a cryptocurrency.

A cryptocurrency is a virtual currency that utilizes a block chain to maintain and operate payment transactions securely and transparently. Examples of different instances of cryptocurrencies include Bitcoin, Linkcoin, Ripple, Nxt, Ether, or other cryptocurrencies.

In embodiments, data is received by one or more nodes in the peer-to-peer network for inclusion in the block chain. This data is generally referred to as a "transaction" and is made available generally to the nodes in the peer-to-peer network. A node that is functioning as a mining node will collect a set of such transactions and group them into a prototype block for potential inclusion as the next block in the block chain. That linkage is recorded by storing the unique identifier (i.e., the cryptographic checksum) of the most recent block in the chain inside of the (new) prototype block such that any reference to the prototype block (via its yet-to-be-determined cryptographic checksum identifier) can be used to find the block previous to it in the chain (i.e., the current block). This arrangement creates a linked "chain" of blocks that can be easily traversed.

The prototype block will only be included in the generally available block chain maintained by the peer-to-peer network if its cryptographic checksum identifier (e.g., a 256-bit integer) meets particular constraints; typically it must be less than a certain, network-determined, value. To accomplish this, the mining node must set the value of an integer called the "nonce," which will be included in the checksum calculations of the prototype block, to any value that produces an appropriate checksum value. All of the blocks in the block chain contain such a value to produce an appropriate cryptographic checksum value for their particular block; typically each value will be different.

The process of determining the value of the nonce is non-trivial, and basically amounts to a search through all possible nonce values. Finding such a value is conventionally called "proof-of-work," reflecting the large amounts of computational effort (i.e., "work") required to find a valid nonce value. In reality, finding a valid nonce value is really much more like "winning" a computational "lottery."

Once a mining node finds a valid nonce value for its prototype block, it then broadcasts the block to the other nodes in the peer-to-peer network. The block will be validated by the other nodes in the network, by, among other means, computing its cryptographic checksum. The network nodes express their acceptance of the new block by working on creating the next (prototype) block in the chain, a block with a different set of transactions, and (most likely) a different nonce value. The cryptographic checksum identifier of the newly accept block will be included in the prototype block to maintain the integrity of the chain.

Another agreed-upon procedure is that the nodes always consider the longest chain to be the correct one. Because it may take time for the block to propagate through the network and because two nodes may broadcast different versions of the next block at the same time, some nodes may receive one version of the block before the other version. In such cases, a node will work on the first one it received, but save the other branch in case it becomes the longer block chain. The decision which branch to follow is made when the next proof-of-work is found and one branch becomes longer; the nodes that were working on the other branch will then switch to the longer branch. This process establishes a "consensus" version of the block chain (i.e., the one accepted by the majority), which is extremely difficult to corrupt; doing so would require mustering computational power greater than that of the current majority of mining nodes in the peer-to-peer network.

In embodiments, new transaction broadcasts do not necessarily need to reach all nodes. As long as they reach many nodes, they will get into a block. In embodiments, block broadcasts are also tolerant of dropped messages. If a node does not receive a block, it will request it when it receives the next block and realizes it missed one.

The initial concept of secure distributed transaction ledger, including cryptocurrency, was proposed in 2009 in a paper entitled "Bitcoin: A Peer-to-Peer Electronic Cash System," listing Satoshi Nakamoto as the author, which is incorporated by reference herein. The details of maintaining and assuring the state of a secure distributed transaction ledger (or block chain) are known in the art and shall not be discussed further herein.

Recently, the technology for secure distributed transaction ledgers has evolved to incorporate a wider range of information. A new generation of decentralized cryptographically verifiable transactions ledgers are emerging that include a Turing Complete computational model; such a model can support smart contracts, among many other things. There are at least two instances of these systems, Ethereum and Bitcoin.

Ethereum is very similar to Bitcoin in that it uses a cryptographically verifiable block chain that is extended by proof-of-work, with the longest chain identifying the consensus. It includes a number of improvements that address limitations in how the Bitcoin block chain is extended, and improve the performance and storage requirements of the process. The most significant feature of the Ethereum framework is the inclusion of a "trustful object messaging compute framework." This framework includes the definition of the "Ethereum Virtual Machine" (EVM) and its associated "bytecode" instruction set. The EVM is an abstract stack machine of similar nature to the Java Virtual Machine (JVM) but not the same. Programs written for the EVM may be referred to as "contracts" or "code" and are recorded in the Ethereum block chain.

In Ethereum, these programs can be invoked by "sending" data to their "addresses" (e.g., a 256-bit address), which were specified when they were originally recorded in the ledger. The execution of the computations using the data as input is part of the block chain "mining" process defined for the system. That is, execution of these programs/contracts is performed by block-chain "miners" whenever a transactional message addressed to the contract is recorded in the block chain. The time and resources required to support the execution of a contract are "paid for" through the exchange of a native virtual currency called "Ether." The amount of currency available for a contract's execution may be pre-specified before execution. If that amount is exceeded execution of the contract is aborted, with no results recorded, and full amount of the currency transferred to the miner; this feature avoids problems with infinite loops in execution, or excessive resource utilization; the miner always gets paid. Thus, the result of such execution is either exhaustion of the resources provided for execution, resulting in no output, or the program completes and generates output. In the latter case, the result is returned to the "caller" or originator as another entry in the ledger.

Returning to FIG. 1, one or more information handling systems, such as a computer 115, mobile phone 120, tablet 125, smart package 130, or server 135 may be configured to connect to the distributed peer network 105 to receive a message or messages according to embodiments of the present invention. In embodiments, the devices may be full nodes of the peer-to-peer network in which they perform mining processes, or they may be watching nodes that perform limited functions, embodiments of which are described herein.

As previously mentioned, an area of particular applicability of the present invention is for transmitting configurations, management instructions, and/or commands for large numbers of computing devices. It is useful to communicate with the devices via a secure distributed transaction ledger both for the benefits of using that mechanism as a communicate channel and for providing a means of payment for service performed by the devices—especially if third-party devices.

Figure 2:
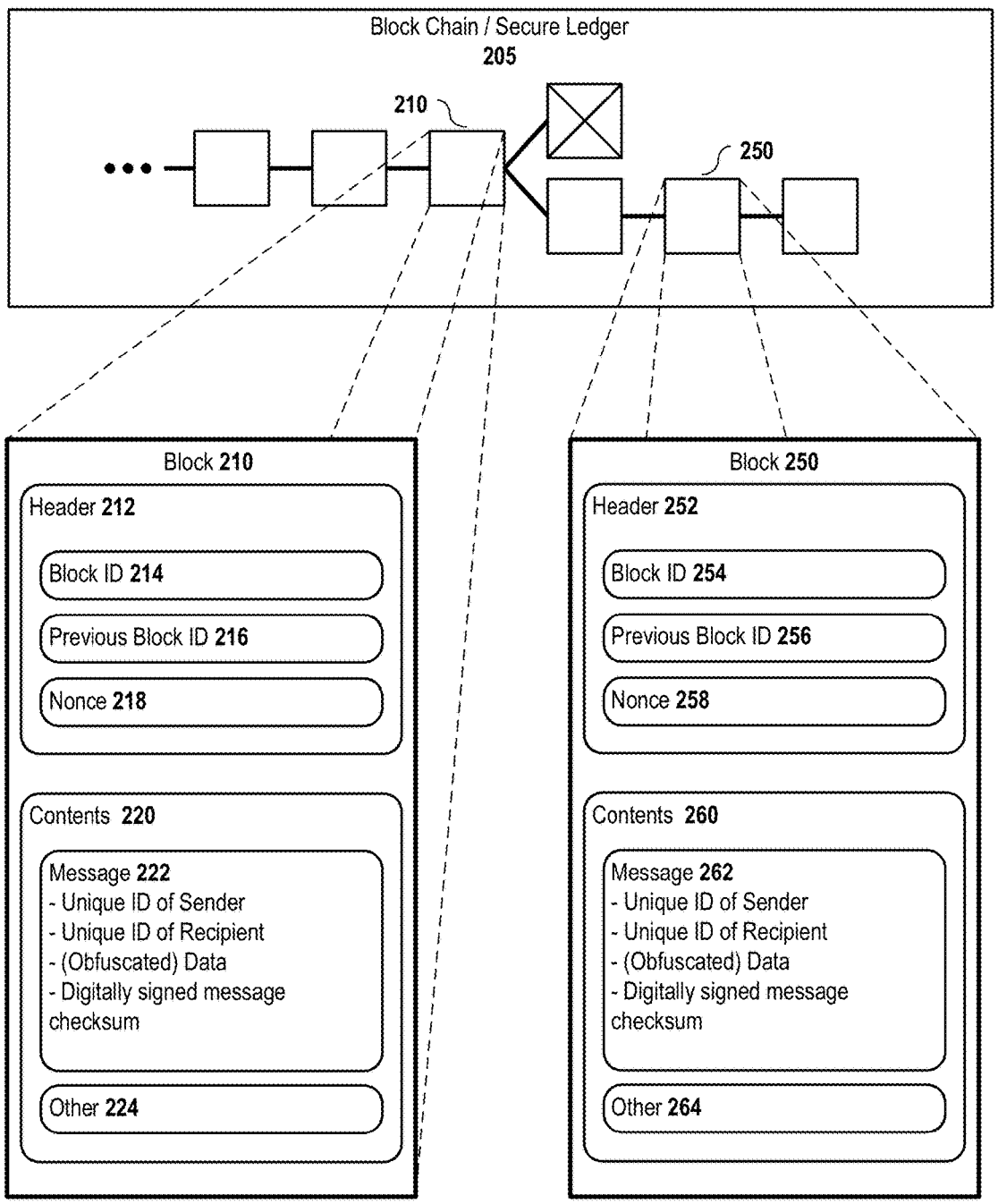
FIG. 2 graphically depicts a block chain or decentralized secure transaction ledger and two sample communications or messages according to embodiments of the present invention.

FIG. 2 depicts example messaging that may be communicated via a distributed secure transaction ledger (or block chain) according to embodiments of the present invention.

C. Block Chain as a Communication Vehicle

In embodiments, a distributed secure transaction ledger, or block chain, may be used to communicate between entities. FIG. 2 graphically depicts a block chain or decentralized secure transaction ledger 205 that is maintained by nodes in a peer-to-peer network. Also depicted in FIG. 2 is an example of two sample communications or messages according to embodiments of the present invention. It shall be noted that using the block chain to communicate information and messages has several benefits. First, messages can be sent to a device, from a device, to a number of devices, from a number of devices, or combinations thereof. Second, it does not rely on a centralized authority. Third, once a message is added to the block chain, it cannot be altered or removed. Fourth, it is decentralized so it is difficult, if not impossible, to block access to it. And fifth, it can be posted for later retrieval.

In embodiments, the block chain 205 may be used to receive messages from or send messages to a device or devices using the block chain. Consider, by way of example, a message in block 210 of the block chain 205. In embodiments, a block 210 may contain a header 212 and contents 220.

In embodiments, the header 212 comprises a block ID 214 for that block, a block ID 216 of the previous block, and a nonce value 218, which represents the "proof of work." In embodiments, this information is used in linking the block into the block chain.

In embodiments, the contents 220 may comprise one or more messages 222 and may also include other data 224. In embodiments, a message 222 may comprise a unique identifier of the sender of the message (or owner/originator/sender of the message). This information may be used for one or more purposes. For example, the identifier helps the receiving device identify who sent the message. In embodiments, the device may be sent messages from various third parties, but may only take direction from an authorized set of one or more entities. The identifier of the owner or sender also provides a way by which the device can address a response to the sender, if desired. Additionally, the identifier of the owner/sender may be used or linked to an account to pay for processing fees or other fees associated with using the block chain as a communication channel, to perform computations, or other actions. Alternatively, a separate account identifier (not shown) may be specified and used for payment purposes.

In embodiments, the message 222 may include instructions, such as configuration data, management data, and/or instruction-related data, for the device. In embodiments, this data may be a link to the configuration data, management data, and/or instruction-related data, or may be the data itself. In embodiments, the configuration data, management data, and/or instruction-related data may be a program, a container, or a link to data (which data may be a program, container, or raw data). In embodiments, a link to a program (or container) may comprise a unique identifier or an address to a program (or bytecode) in the block chain, may be a link to an application or container available outside the block chain, or a combination thereof. Because this data is publicly in the ledger, the sender may obfuscate some or all of the message data by encrypting it.

In embodiments, the message 222 may include a way or ways for authenticating the message. For example, in embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

It shall be noted that embodiments of the present invention may include the device or devices sending a message. For example, the block chain 205 may be used to send messages regarding the confirmation, configuration status, results information, or other data. Consider, by way of example, a message in block 250 of the block chain 205. In embodiments, a block 250 may contain a header 252 and contents 260.

Like the header 212 discussed with respect to block 210, the header 252 of block 205 comprises a block ID 254 for that block, a block ID 256 of the previous block, and a nonce value 258, which represents the "proof of work."

Similar to the message in the block 210, in embodiments, the contents 260 may comprises one or more messages 262 and may also comprise other data 264. In embodiments, a message 262 may comprise a unique identifier of the recipient of the message, which may be the originator of the initial message 210 or another entity.

In embodiments, the message may include a unique identifier of the submitter of the message. This information may be used for one or more purposes. For example, the identifier helps identify who sent the message. Additionally, the identifier may be used or linked to an account to pay for or receive fees associated with using the block chain as a communication channel, for performing calculations, or other actions. Alternatively, a separate account identifier may be specified and used.

In embodiments, the message 262 includes data (e.g., confirmation of receipt of the message, confirmation of configuration, configuration status, results information, or other data) or a link to the data. In embodiments, some or all of that data may be obfuscated by encryption.

In embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

D. Embodiments of Methods

1. Initial Configuration/Broadcast Messaging

In embodiments, initial configuration of a computing device may be accomplished by the device sending a "broadcast" message requesting the identity of an entity that can provide configuration for a device of its type, version, location, function, and/or any other identifying information for use in procuring the proper identity. After receiving a response to this request, the device may send a message to the configuration provider to initiate the procurement of configuration information. In embodiments, this interaction may result in an exchange of several messages as the two parties confirm or refine the details of the request, and, possibly, each other's identities. In embodiments, the configuration provider may directly transfer the configuration information at this stage; but in embodiments, especially for large transfers, the provider may provide information to the device/requestor on how to obtain and validate the configuration information. For example, it might provide the MD5 checksum of the data to be retrieved along with a Uniform Resource Locator (URL) of a provider that, in turn, could address a server or download site, such as BitTorrent.

It shall be noted that the message or messages may be addressed to one device or may be addressed for a plurality of devices that receive the message or messages via the block chain.

Figure 3:
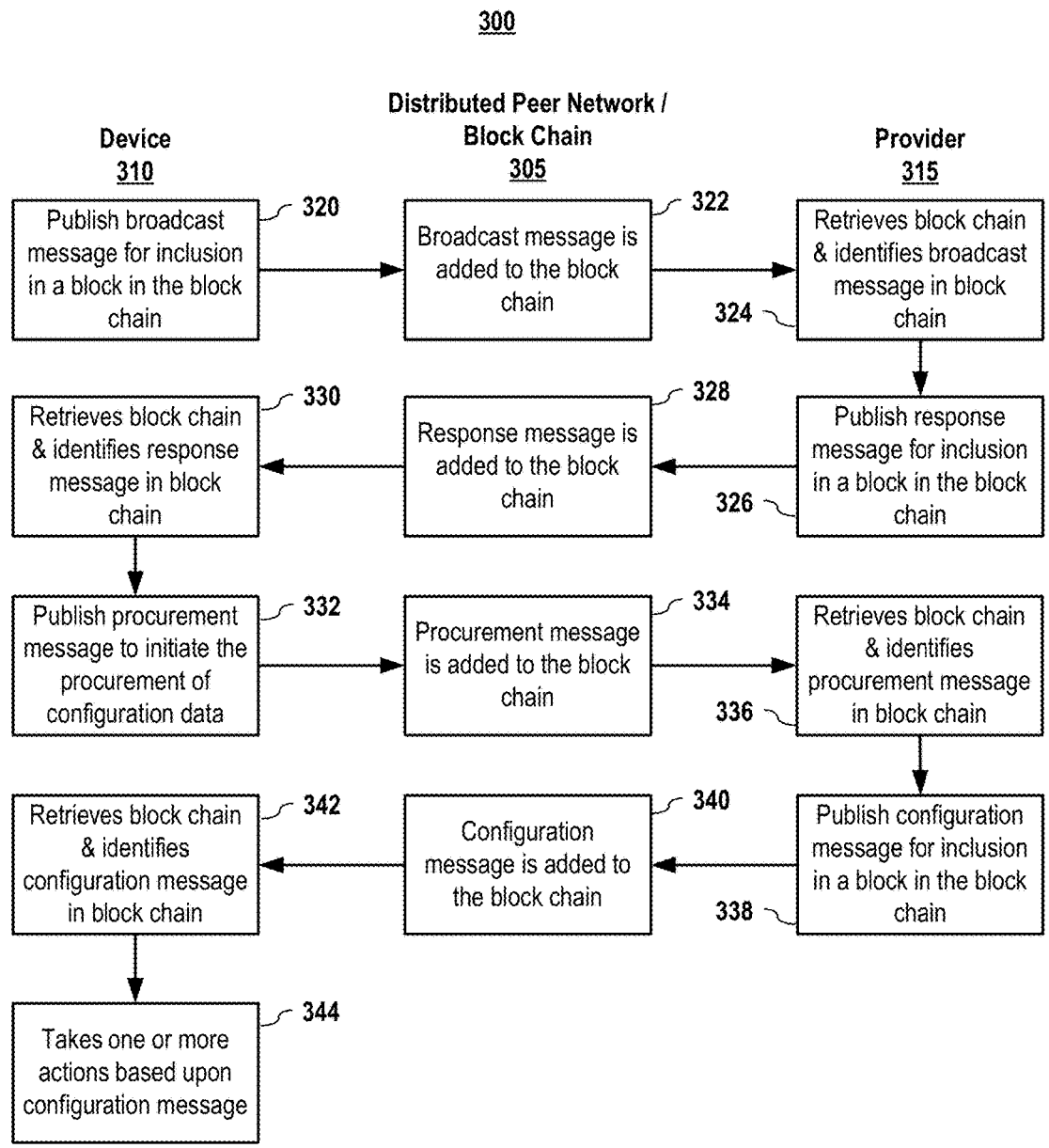
FIG. 3 depict broadcast message passing using a secure distributed transaction ledger according to embodiments of the present invention.

FIG. 3 depict broadcast messaging using a secure distributed transaction ledger according to embodiments of the present invention. In embodiments, a device 310 publishes (320) a broadcast message to one or more nodes that participate in the peer-to-peer network 305 for inclusion in a block in the block chain. In embodiments, the broadcast message requests a provider to provide configuration information or other data. The broadcast message is added (322) to the block chain in the normal course of maintaining the block chain.

In embodiments, a provider 315 retrieves the block chain and identifies (324) whether the broadcast message in block chain is relevant to it. Responsive to the message being relevant to the provider, in embodiments, the provider 315 publishes (326) a response message to one or more nodes in the peer-to-peer network, and the message is then added (328) to the block chain.

In embodiments, the device 310 retrieves the block chain and identifies (330) the response message in the block chain is directed to it. Responsive to the message being relevant to the device, in embodiments, the device 310 publishes (332) a procurement message to one or more nodes in the peer-to-peer network for inclusion (334) in a block in the block chain.

In embodiments, a provider 315 retrieves the block chain and identifies (336) whether there is a message in block chain that is relevant to it. Responsive to identifying the procurement message directed to the provider, in embodiments, the provider 315 publishes (326) a configuration message, which is added (340) to the block chain by one or more nodes in the peer-to-peer network.

In embodiments, the device 310 retrieves the block chain and identifies (342) that the configuration message in block chain is directed to it. Responsive to the message being relevant to the device, in embodiments, the device 310 takes one or more actions based upon the configuration message. For example, in embodiments, the configuration message may include the configuration data as a program, as a bytecode address in the block chain, as a container, or as a link to the configuration data. In embodiments, the configuration data configures the device to operate or provide functionality desired by the provider and/or makes it easier for the provider to manage the device.

2. Authentication/Verification

It shall be noted any one or more of the messages may be authenticated or verified by the recipient. Consider, by the example process depicted in FIG. 4.

Figure 4:
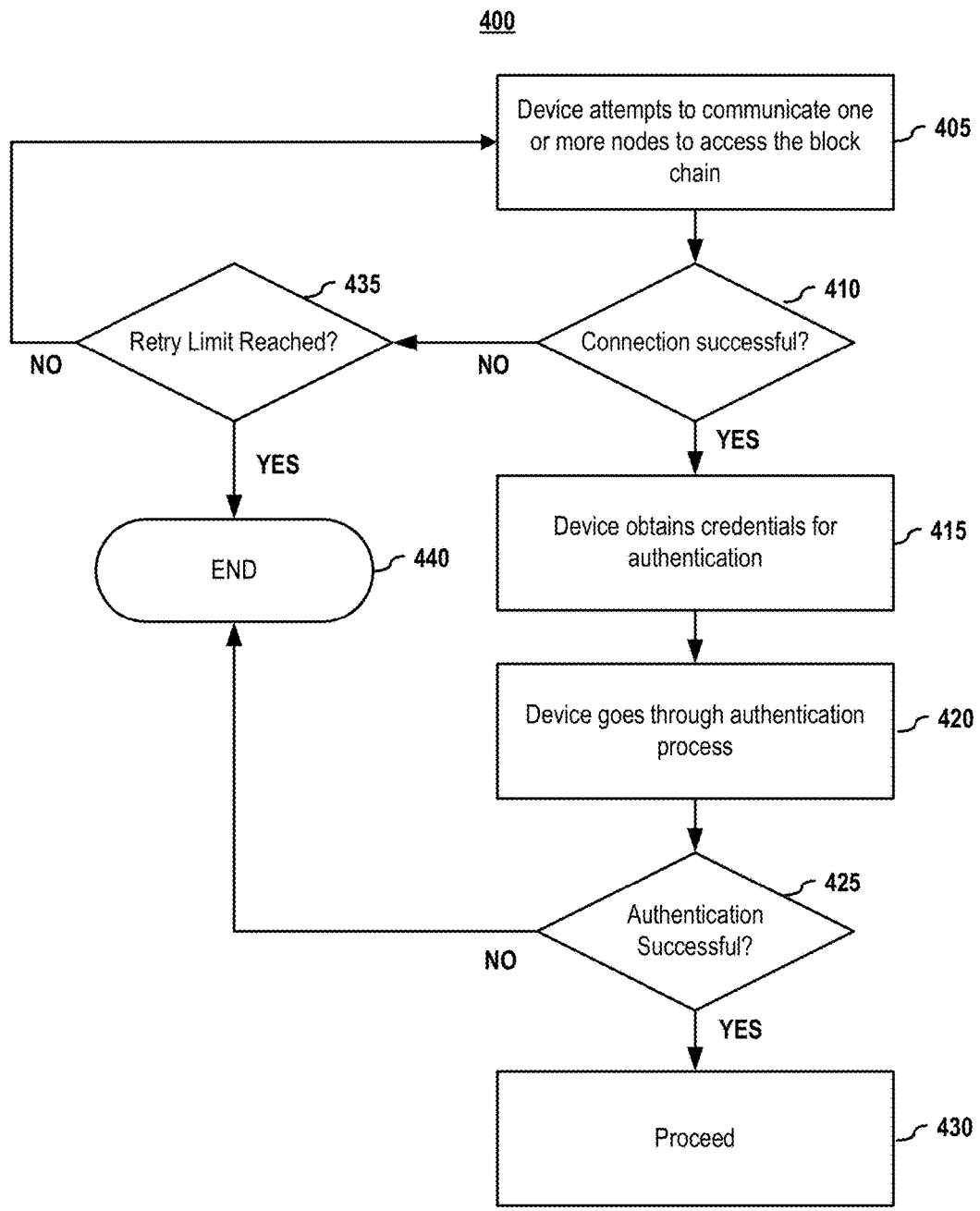
FIG. 4 depict a method for accessing a secure distributed transaction ledger and authenticating according to embodiments of the present invention.

FIG. 4 depicts a method for accessing a secure distributed transaction ledger and authenticating according to embodiments of the present invention. In embodiments, a device attempts (405) to communicate with one or more nodes in the peer-to-peer network. If the device is unable (410) to access the block chain, a check is made (435) to determine if the number of attempts to access the block chain has been exceeded. If the number has been exceeded, the process may take one or more actions, such as termination (440). In embodiments, one or more other actions may also be taken, such as sending one or more alert messages.

If the retry limit condition has not been reached (435), then the device may re-attempt (405) to communicate with one or more nodes to access the block chain. In embodiments, the device may wait until one or more conditions are met before re-attempting to communicate with the decentralized network. For example, in embodiments, the device may wait a certain amount of time, or until network connectivity is available, etc.

If the connection is successful, the device accesses the block chain and identifies a message or messages directed to it.

In embodiments, the device obtains (325) the credentials of a user attempting to communicate with the device. The recipient device uses those credentials, and data it extracts from the message or messages directed to it that came from the block chain, to undergo (420) an authentication process.

In embodiments, if the authentication is successful (425), one or more additional methods may be performed (430) depending upon the nature of the device and the message instructions. In embodiments, following authentication, the device obtains the instructions from the block chain. Given the instructions, the device takes one or more actions based upon the received instructions. For example, FIG. 5 depict a method for configuration of or instruction execution by a device using a secure distributed transaction ledger according to embodiments of the present invention.

3. Embodiments of Configuration/Instruction Execution

Figure 5:
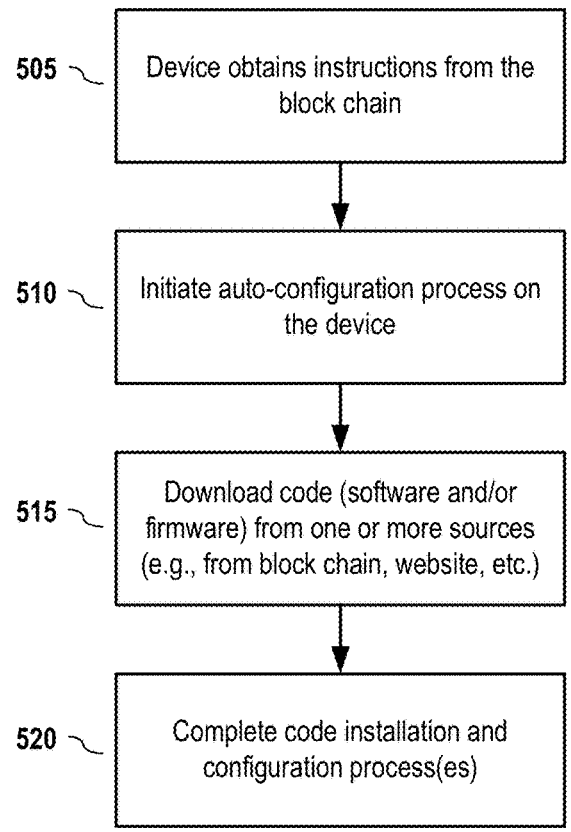
FIG. 5 depict a method for configuration of a device using a secure distributed transaction ledger according to embodiments of the present invention.

FIG. 5 depict a method for configuration of or instruction execution by a device using a secure distributed transaction ledger according to embodiments of the present invention. In embodiments, following authenticated, the device obtains (505) the configuration-related instructions or execution instructions from the block chain. In embodiments, an auto-configuration process is initiated (510) on the device where it decides if the configuration process requires additional data or instructions from other sources to complete. If appropriate or required for the particularly configuration instructions, the device may download (515) code (software, firmware, or both) for the configuration. In embodiments, the download may be from one or more blocks in the block chain, from a website, from a cloud resource, etc. Alternatively or additionally, the particular software and/or firmware may be stored in memory in the device and the instructions from the block chain unlock (e.g., unencrypt it) or otherwise allow access to it. With configuration instructions and the necessary code, the device completes (520) the installation and configuration process.

In embodiments, the device may send a response message to the provider/message sender, to a third party, or both. In embodiments, the response message may indicate whether the instructions were successfully executed, may indicate issues related to the execution of the instructions, may indicate successful completion of the configuration, may indicate issues related to the configuration, or other data.

4. Code Updates

In embodiments, a task of obtaining updated code (e.g., software, firmware, etc.) for the computing device may be obtained in a manner the same or similar to the way in which the initial configuration was obtained. In embodiments, one difference is that the computing device would already have information on potential sources of software updates; therefore, the initial broadcast or discovery phase in which it tries to find such a source may be skipped.

However, should the previous source disappear or fail to respond timely, the computing device may resort to broadcasting a requisition for this information to discover potential replacements. This method addresses situations where a provider has disappeared (for any reason) and another is to be found. Consider, by way of illustration, the method depicted in FIG. 6.

Figure 6:
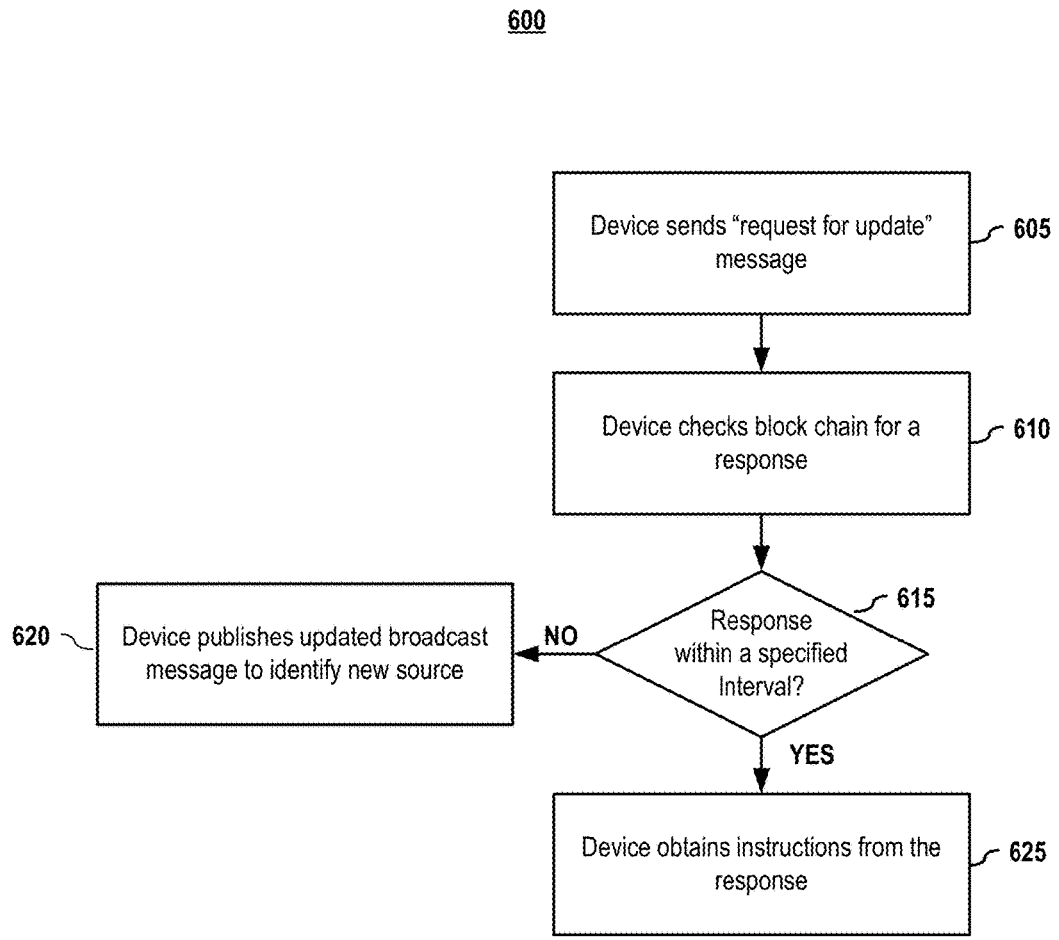
FIG. 6 depicts a method for obtaining updates by a device using a secure distributed transaction ledger according to embodiments of the present invention.

FIG. 6 depicts a method for obtaining updates by a device using a secure distributed transaction ledger according to embodiments of the present invention. In embodiments, a device sends (605) a "request for update" message that gets included into the block chain, and the device checks (610) the block chain for an update response.

Responsive (615) to an update message being received within a specified interval (which may be a set time period or a set number of updates to the block chain), the device obtains (625) the update instructions from the response and proceeds according to the instructions.

Responsive (615) to an update message not being received within a specified interval, the device may publish (620) a broadcast message to identify a new source. In embodiment, the broadcast messaging process and the process for obtaining the data required for the update may be the same or similar to that describe above with respect to FIG. 3.

5. Commands

In embodiments, a managing entity or provider may issue one or more commands to one or more devices for execution by the one or more devices. In embodiments, a "command" may be an asynchronous request from the entity for the computing device to perform some function. In embodiments, the set of commands that may be supported by any particular device may be device specific. A command may be as simple as a request to provide a simple data value, like the current temperature, or it may be more complicated, such as a request to participate in a BitTorrent to provide data, such as a software update, to a peer. Or, a command may be to perform all or a portion of a complex computation, such as rendering all or a portion of a video. One skilled in the art shall recognize that any number of types of tasks may be requested and performed.

Figure 7:
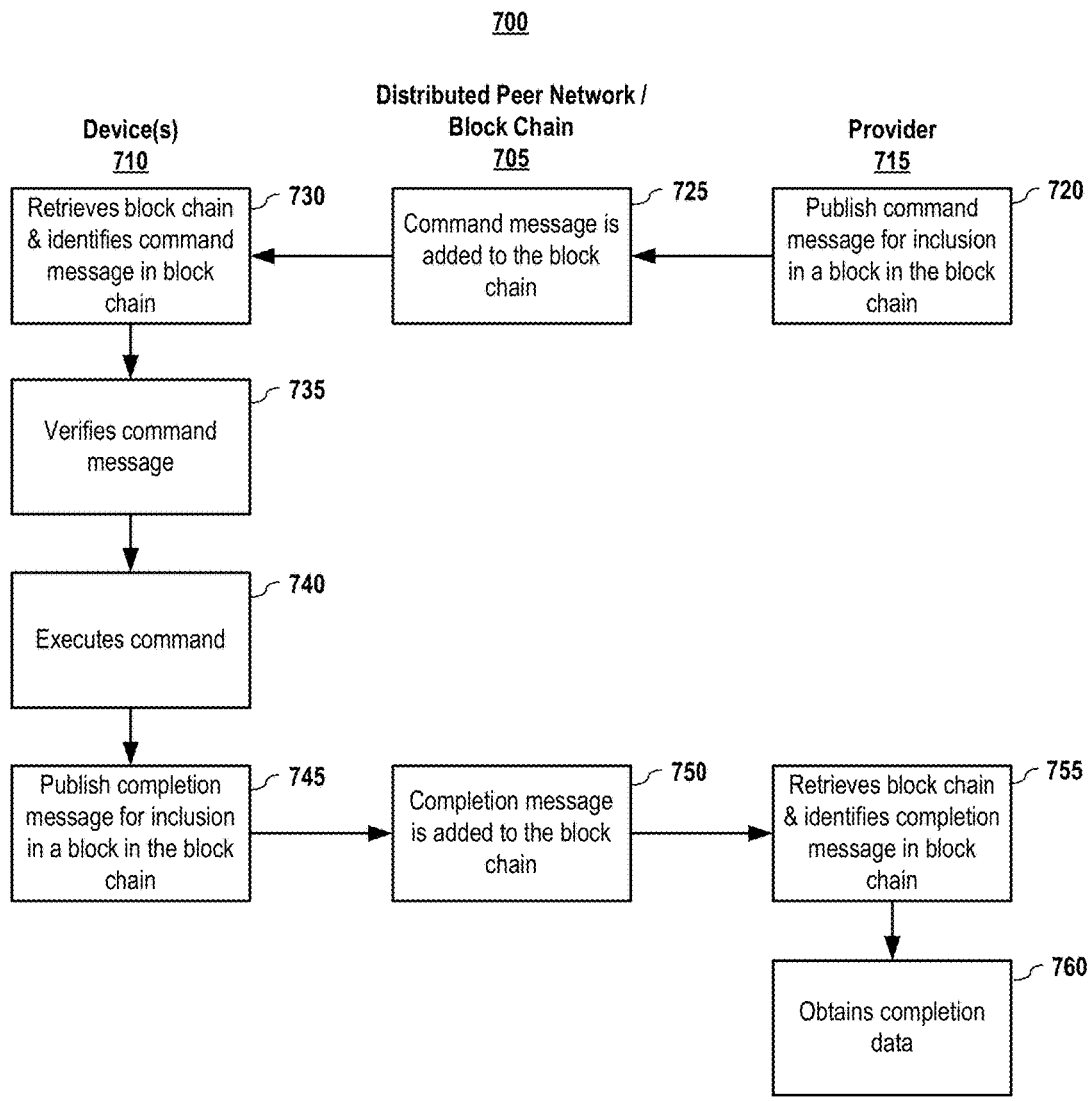
FIG. 7 depicts an exemplary command execution methodology according to embodiments of the present invention.

FIG. 7 depicts an exemplary command execution methodology according to embodiments of the present invention. In embodiments, an entity or provider 715 publishes (720) a command message for inclusion (725) in a block in the block chain.

In embodiments, the device or devices that have been configured to monitor for command messages retrieve (730) the block chain and identify the command message in the block chain. In embodiments, a receiving device may verify the authenticity of the command message (like as discussed above). Responsive to the command message being valid, the device or devices execute (735) the command or commands in the command message.

In embodiments, the execution of the command may be all that the device or devices are requested to do. Alternatively, in embodiments, the executing device or devices may publish (745) a completion message for inclusion (750) in a block in the block chain. In embodiments, the provider/entity may later retrieve (755) the block chain and extract the completion message from the block chain. In embodiments, the completion message may include the results of the executed command, a link to the results data, a confirmation that the command or commands were executed, or the like.

It shall also be noted that other techniques for processing asynchronous requests in a message-passing framework are well known to those skilled in the art, and are not detailed here, but may be employed herein given that there is a component to interface with a peer-to-peer system to communicate messages using the ledger and generate "message arrival" events in the computing device's main command processing implementation.

E. System Embodiments

As noted previously, areas of applicability of these methodologies are in configuring and managing computing devices using a decentralized secured transaction ledger. Examples of such devices are those that incorporate computation and communication functions. Presented below are examples of such system embodiments.

1. Information Handling System

In embodiments, aspects of the present patent document may also be directed to information handling systems/computing devices. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
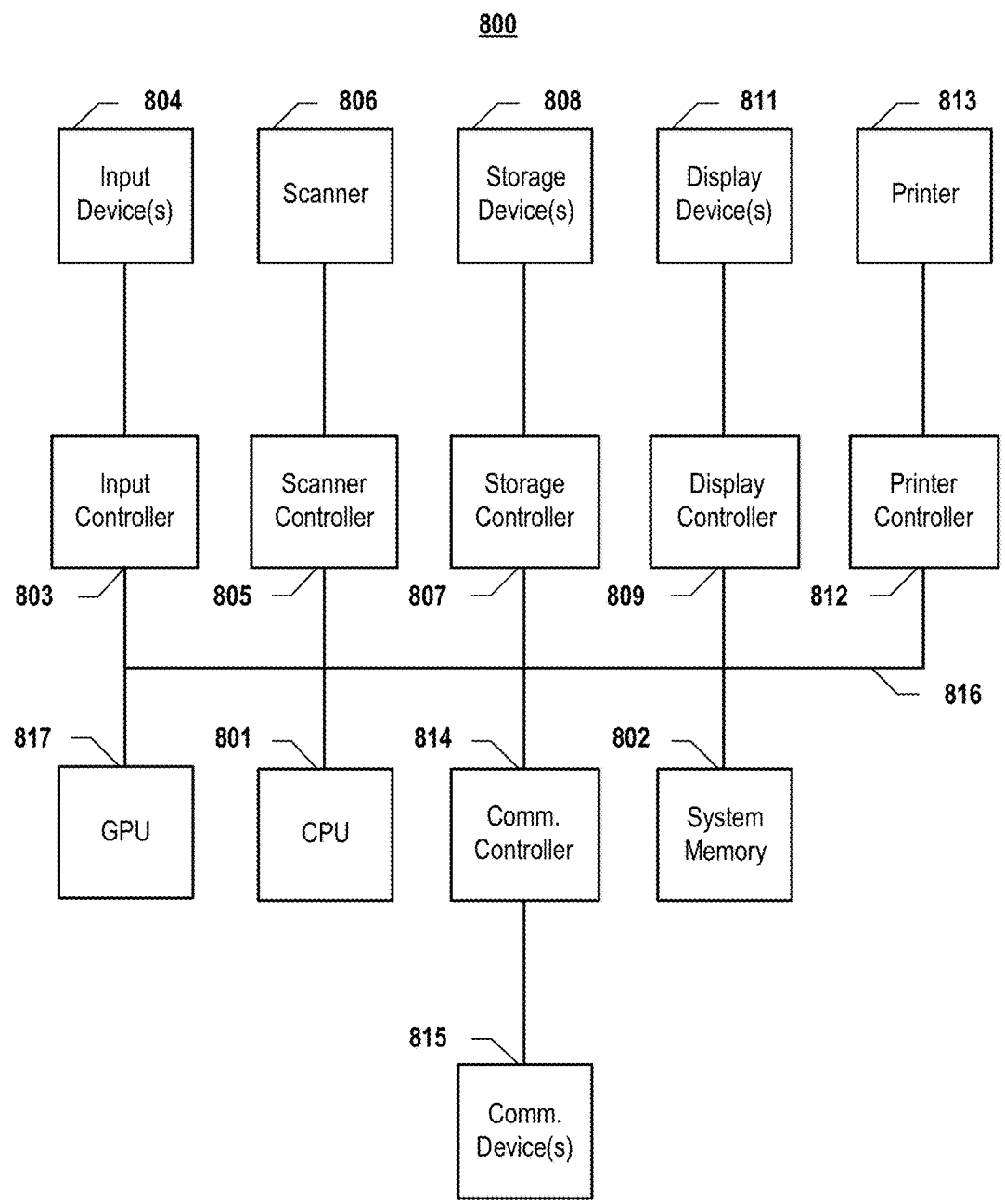
FIG. 8 depicts a simplified block diagram of an information handling system according to embodiments of the present invention.

FIG. 8 depicts a simplified block diagram of an information handling system according to embodiments of the present invention. It will be understood that the functionalities shown for system 800 may operate to support various embodiments of an information handling system—although it shall be understood that an information handling system may be differently configured and include different components.

As illustrated in FIG. 8, system 800 includes one or more central processing units (CPU) 801 that provides computing resources and controls the computer. CPU 801 may be implemented with a microprocessor or the like, and may also include one or more graphics processing units (GPU) 817 and/or a floating point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, or stylus. There may also be a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. The computing system 800 may also include a printer controller 812 for communicating with a printer 813. A communications controller 814 may interface with one or more communication devices 815, which enables system 800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

2. Computing Device Components

In embodiments, the computing device 800 may comprise one or more configuration/instruction executing modules for performing one or more of the methods discussed herein. Embodiments of configuration/instruction-executing modules are described in more detail with reference to FIGS. 9 and 10.

Figure 9:
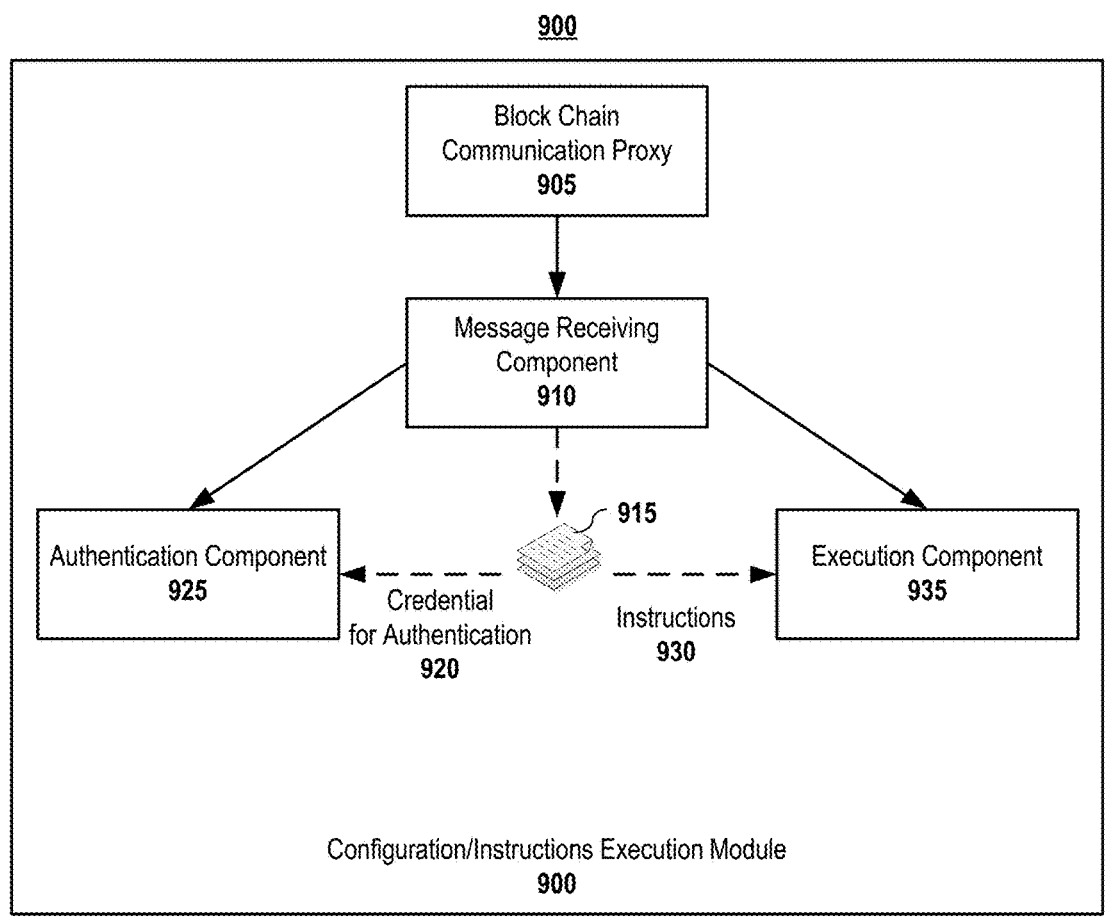
FIG. 9 depicts a simplified block diagram of configuration/instructions-execution modules according to embodiments of the present invention.

FIG. 9 depicts a simplified block diagram of configuration/instruction-executing modules according to embodiments of the present invention. In embodiments, the modules depicted in FIG. 9 operate to perform one or more of the methods described above.

In embodiments, the configuration/instruction module 900 comprises a block chain communication proxy module 905, a message receiving module 910, a message intended for the device that contains data, credentials, and/or instructions 915 extracted from the block chain, an authentication component 925, and an execution component 935.

In embodiments, the block chain communication proxy module 905 is used to interface with the distributed network (e.g., network 105). In embodiments, one of its functions is to abstract the details of the communications channel by leveraging the block chain to retrieve and store data. In embodiments, the block chain communication proxy module 905, or module 905 in conjunction with message receiving module 910 and authentication module 925, receives messages from the block chain and uses the digital signature associated with the message to authenticate that the source of the message is from an entity from which the device should take messages. In embodiments, the system 900 may include an encryption module (not shown) to perform one or more encryption/decryption-related functions. In embodiments, the block chain communication proxy module 905 passes messages from the block chain to the message receiving module 910.

Responsive to the message being from a verified source, which may be verified using credential 915 and authentication component 925, from which the device should take instruction, the instructions 930 are sent to an execution component 935. In embodiments, the execution component 935 may execute the instructions. In embodiments dealing with configuration, the execution component may comprise one or more additional modules for configuring the device, as shown in FIG. 10.

Figure 10:
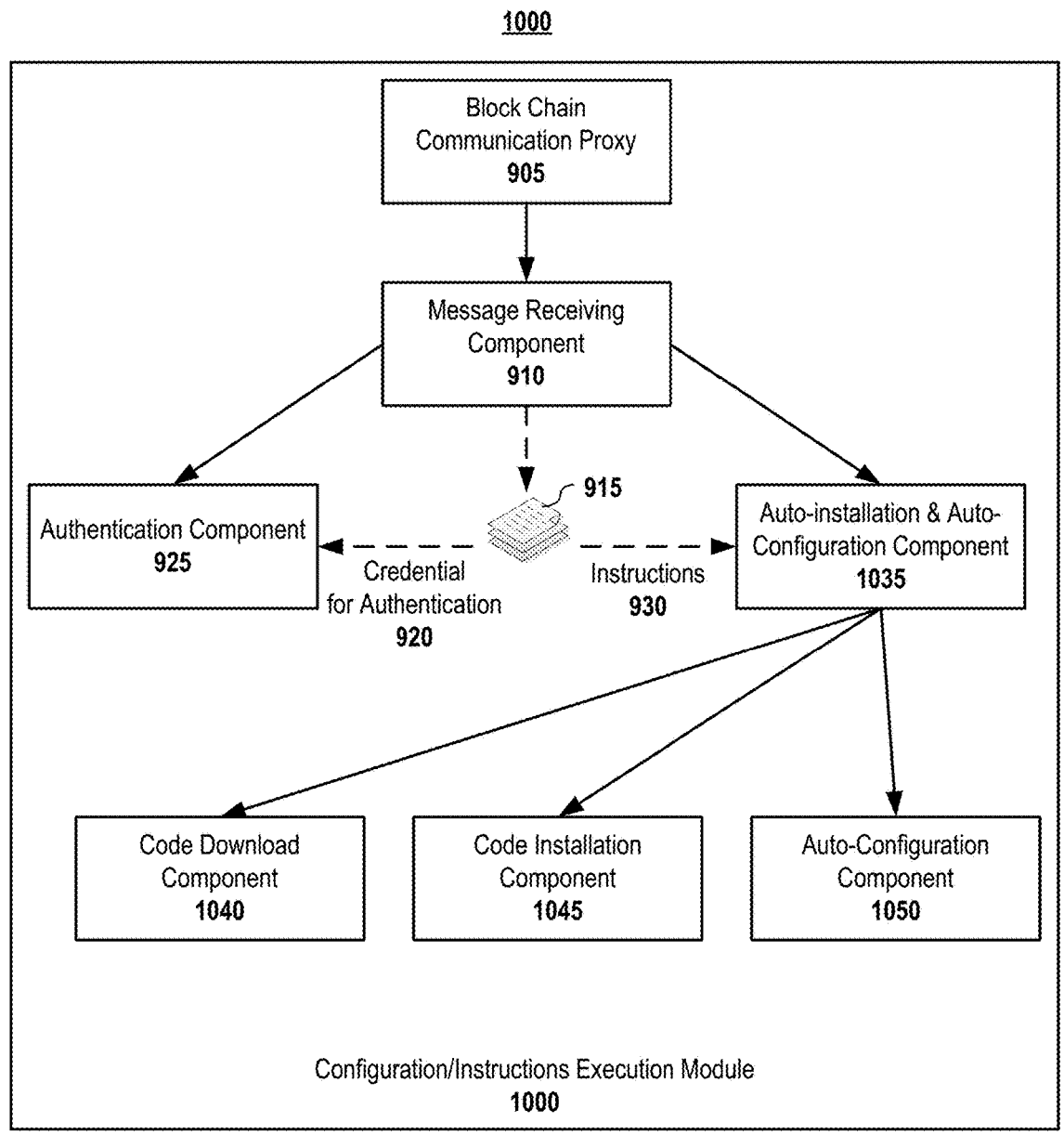
FIG. 10 depicts a simplified block diagram of an alternative embodiment of configuration/instructions-execution modules according to embodiments of the present invention.

FIG. 10 depicts a simplified block diagram of instructions-execution/configuration modules according to embodiments of the present invention. As shown in FIG. 10, the execution component 935 may be or may include an auto-installation and auto-configuration component 1035 that comprises one or more modules. In embodiments, these modules may comprise a code (software, firmware, or both) download component 1040 that downloads code for configuring the device, a code installation component 1045 that installs the downloaded code, and an auto-configuration component 1050 that configures the device based upon the received instructions and code.

It shall be noted that device configuration embodiments and device instruction execution embodiments may comprise all or some combination of the components described in FIGS. 9 and 10, depending upon desired functionalities.

In embodiments, the module 900/1000 may also include a system interface module to interface with the system components for various purposes. For example, the system interface may interface with the one or more components of the device to read and/or write data, to send and receive data (including messages), to disable or enable features, and to display alerts. In embodiments, the system interface may use existing interfaces of the system. In embodiments, these interfaces provide abstract representations of the physical devices. In embodiments, these abstractions separate the functions from the details of a particular hardware instance or architecture. This ensures that embodiments of the present invention are applicable to a broad class of information handling devices that can provide such interface abstractions.

In embodiments, the module 900/1000 may also include a mining module (not shown) to perform mining operations related to the distribute network and the maintenance of the block chain. Because this process can be resource intensive, the computing device may not perform full mining functions. In embodiments, the computing device may only perform limited functionality. In embodiments, the computing device may only perform resource intensive operations when the computing device is plugged into a stable, continuous power source rather than a battery. In embodiments, the computing device may be such that it is loaded compared to its computational capacity. An example might be a device embedded in relatively static environment such as a building or a vehicle, where it is well powered and has good network connectivity, and that monitors environmental parameters (e.g., the temperature). Such a device would be a good candidate to play the role of a mining node in the distributed network.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for a computing device participating to be managed by a provider entity, the method comprising:

submitting, to one or more nodes of a distributed peer-to-peer network that maintains a block chain, a broadcast message requesting an identifier of a provider entity that can provide configuration data for the computing device, the broadcast message for inclusion in the block chain, the block chain comprising a cryptographically linked sets of data blocks;

obtaining at least part of the block chain;

examining one or more of the data blocks of the block chain for a response message directed to a computing device comprising a specific identifying characteristic; and responsive to identifying the response message directed to a computing device comprising a specific identifying characteristic and responsive to determining that the computing device comprises the specific identifying characteristic, executing one or more instructions in the response message that configures the computing device for future execution of one or more commands issued by the provider entity.

2. The computer-implemented method of claim 1 further comprising:

verifying whether the response message was sent by an authorized entity before executing the one or more instructions in the response message;

responsive to the provider entity not being an authorized entity, not executing the one or more instructions in the response message; and responsive to the provider entity being an authorized entity, executing the one or more instructions in the response message.

3. The computer-implemented method of claim 1 further comprising:

submitting, to one or more nodes of the distributed peer-to-peer network that maintains a block chain, a "request for update" message requesting update data for the computing device from the provider entity, the "request for update" message for inclusion in the block chain;

obtaining at least part of an updated block chain;

examining one or more of the data blocks of the updated block for an update response message issued by the provider entity; and responsive to identifying the update response message, executing one or more instructions in the update response message.

4. The computer-implemented method of claim 3 further comprising:

responsive to not identifying an update response message in an updated block chain within a specified interval, submitting, to one or more nodes of the distributed peer-to-peer network that maintains a block chain, an update broadcast message requesting an identifier of a provider entity that can provide updated data for the computing device, the update broadcast message for inclusion in the block chain.

5. The computer-implemented method of claim 1 wherein the step of executing one or more instructions in the response message that configures the computing device for future execution of one or more commands issued by the provider entity comprises:

initiating an auto-configuration process on the computing device;

downloading code from one or more sources; and completing code installation and configuration processes of the computing device.

6. The computer-implemented method of claim 1 further comprising:

executing one or more commands issued by the provider entity.

7. The computer-implemented method of claim 6 wherein the step of executing one or more commands issued by the third-party entity comprises:

obtaining at least part of an updated block chain;

examining one or more of the data blocks of the updated block for a command message issued by the provider entity;

responsive to identifying the command message, executing one or more instructions in the command message issued by the third-party entity.

8. The computer-implemented method of claim 7 further comprises:

submitting, to one or more nodes of a distributed peer-to-peer network that maintains the block chain, a completion message comprising completion data for the provider entity, the completion message for inclusion in the block chain.

9. The computer-implemented method of claim 8 further the completion data comprising a reference to a set of results data.

10. An information handling device comprising:

one or more processors;

one or more memory components communicatively coupled to the processor;

one or more network interfaces, communicatively coupled to the processor, that provides access to one or more networks; and an instructions subsystem comprising:

a block chain communication proxy, communicatively coupled to the network interface, that interfaces with one or more decentralized nodes of a peer-to-peer network, the peer-to-peer network comprising a plurality of nodes that maintain a cryptographically secure and public block chain comprising a cryptographically linked sets of data blocks;

a message receiving component that identifies a message in the block chain directed to an information handling device comprising a specific identifying characteristic that the information handling device possesses and that extracts the message;

an authentication component, communicatively coupled to the message receiving component, that receives at least part of the message from the message receiving component and authenticates that the message originated from an authorized entity from which the information handling device should take instruction; and an execution component, communicatively coupled to the message receiving module, that executes one or more instructions in the message for the benefit of the authorized entity.

11. The information handling device of claim 10 wherein one or more instructions in the message for the benefit of the authorized entity comprises instructions for configuring the information handling device according to instructions of the authorized entity.

12. The information handling device of claim 11 wherein the execution component performs the step of configuring the information handling device according to instructions of the authorized entity by performing the steps comprises:
   initiating a configuration process on the information handling device;
   downloading code from one or more sources; and
   completing code installation and configuration processes of the information handling device.

13. The information handling device of claim 12 wherein the one or more sources comprise at least one of:
   one or more data blocks in the block chain;
   a third-party site; and
   a site of the authorized entity.

14. The information handling device of claim 10 wherein one or more instructions in the message for the benefit of the authorized entity comprises a command message to execute one or more instructions issued by the authorized entity.

15. The information handling device of claim 14 wherein the command message is received from the authorized entity via a data block in the block chain.

16. The information handling device of claim 14 wherein the block chain communication proxy submits to one or more nodes of the distributed peer-to-peer network a completion message identifying completion data for the authorized entity, the completion message for inclusion in the block chain.

17. A computer-implemented method for managing one or more computing devices, the method comprising:
   publishing, from a provider computing system to one or more nodes of a distributed peer-to-peer network that maintains a block chain, a command message directed to one or more computing devices having a specific identifying characteristic and instructing at least one of the one or more computing devices to execute one or more instructions identified in the command message, the block chain comprising a cryptographically linked sets of data blocks;
   obtaining at least part of the block chain;
   examining one or more of the data blocks of the block chain for a results message from at least one of the one or more computing devices, the results message comprising identifying results data related to execution of the one or more instructions identified in the command message; and
   responsive to identifying the response message, obtaining results data identified in the results message.

18. The computer-implemented method of claim 17 wherein the one or more instructions identified in the command message comprises one or more instructions to obtain code from at least one of:
   one or more data blocks in the block chain;
   a third-party site; and
   a site maintained by an entity that owns or manages the provider computing system.

19. The computer-implemented method of claim 17 further comprising:
   receiving from a computing device, via a data block in the block chain, a broadcast message requesting configuration data for the computing device; and
   publishing, to one or more nodes of a distributed peer-to-peer network that maintains the block chain, a configuration message providing one or more instructions for configuring the computing device to be managed by the providing computing system.

20. The computer-implemented method of claim 17 further comprising:
   receiving from a computing device, via a data block in the block chain, a "request for update" message requesting updated configuration data for the computing device; and
   publishing, to one or more nodes of a distributed peer-to-peer network that maintains the block chain, an update configuration message providing one or more instructions for updating the configuration of the computing device that is managed by the providing computing system.

* * * * *